July 4, 1933.          A. V. SAHAROFF          1,916,685
VALVE
Filed Feb. 12, 1930
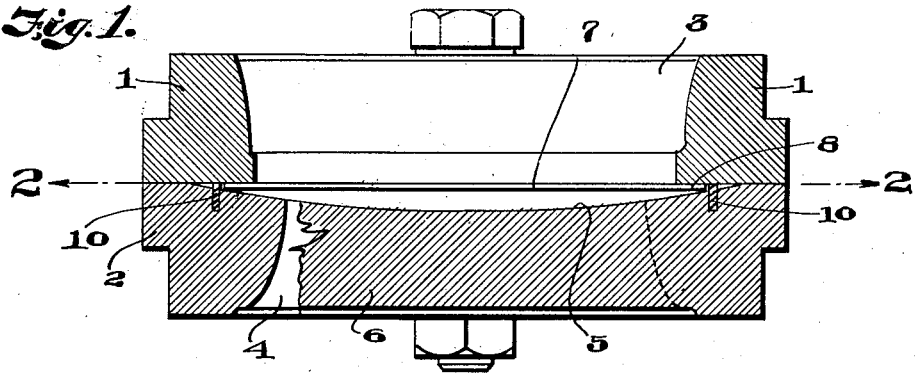
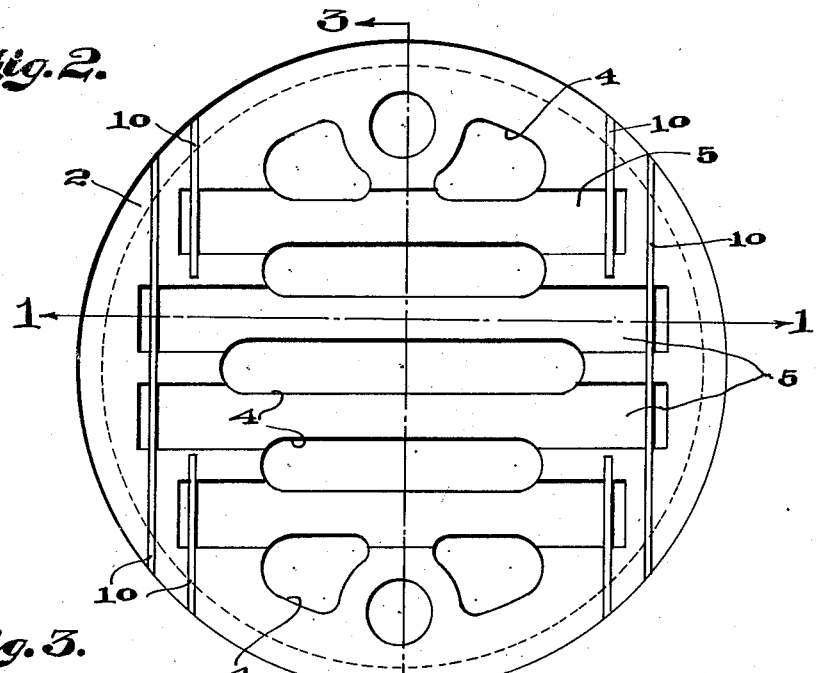
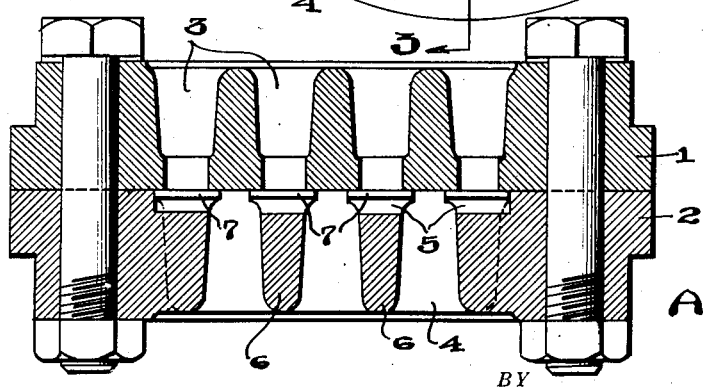
A.V. SAHAROFF.
INVENTOR
BY
ATTORNEY Patented July 4, 1933

1,916,685

UNITED STATES PATENT OFFICE

ALEXANDER V. SAHAROFF, OF CINCINNATI, OHIO, ASSIGNOR TO WORTHINGTON PUMP AND MACHINERY CORPORATION, OF NEW YORK, N. Y., A CORPORATION OF VIRGINIA

VALVE

Application filed February 12, 1930. Serial No. 427,667.

This invention relates to automatic plate valves adapted for use in high speed gas and air compressors, and the like, and especially to automatic plate valves of the class that function by bending and are free from localized bending with its resulting crystallization of the metal and early fracture.

More specifically the invention relates to automatic plate valves of that class described in United States Patent Reissue 13,991 and Patent Number 1,341,145 and an object of the present invention is to provide an improved valve of this class in which pinching of the valve strips between the seat and guard at the ends of the strip will be prevented.

In the construction of valves of the type as disclosed in the above mentioned patents and corresponding types of valves it has heretofore been the practice to mill the concave surfaces of the guard on two radii instead of on a single radius, because the milling of the guards on a single radius would cause very sharp angles at the termination of the concave surfaces of the guards and invariably result in the pinching of the ends of the strips causing a strain on the ends of the strip resulting in breakage of strips, "digging in" of the ends of the strip in the guard and other disadvantages which impair the longevity and efficiency of the valve. The milling of the ends of the concave portions on short radii so as to make the angle between the seat and guard as blunt as possible to prevent pinching necessarily left the strip unsupported for an appreciable part of the guard resulting in numerous definite objections.

The present invention comprehends 'the provision of a valve structure which embodies all of the advantages, not only in valve operation but in manufacture of the valves, of milling the guards on a single radius throughout the entire length of their concave surfaces and eliminates the undesirable and definite objections to such a construction by providing abrupt or transverse shoulders near the ends of the millings of the guard to form stops for the valve strips and in providing the ends of the guard with a square shoulder to a depth equal to the thickness of the strip, plus suitable tolerance, eliminates all possibility of pinching of the ends of the strips.

With these and other objects in view which will appear from the following specification, the invention consists in various features of construction and combination of parts, which will be first described in connection with the accompanying drawing, showing a valve of the preferred form embodying the invention and the features forming the invention will be specifically pointed out in the claim.

In the drawing Figure 1 is a cross-section through a valve constructed in accordance with this invention and taken on the line 1 of Figure 2.

Figure 2 is a plan view of the guard section of the valve taken on the line 2—2 of Figure 1.

Figure 3 is a cross-section through the valve taken on line 3—3 of Figure 2.

Referring more particularly to the drawing, the improved valve comprises the valve seat 1 and guard member 2. The valve seat 1 and guard 2 are provided with parallel spaces or passageways 3 and 4 respectively which are disposed in staggered relations as clearly shown in Figure 3 of the drawing. The guard or abutment 2 has concave recesses 5 milled in the ribs 6 which are spaced between the openings 3, which milled surfaces 5 serve as abutment surfaces for the valve strips 7. The valve strips 7 are thin flexible plates and normally rest against the flat abutment surfaces 8 of the valve seat member 1.

The milled surfaces 5 are milled upon the single uniform radius so that the valve strips 7 when in open position are subjected to the stresses of a uniformly loaded lever and the strip has a perfect backing against the guard throughout its entire length without unnatural stress or fatigue at any point. Also the milling of the surfaces 5 on a single uniform radius materially reduces the cost of manufacture of the valves. To prevent the pinching of the ends of the strips 7 by the sharp angles which are formed by the milling of the surfaces 5 on a uniform radius and consequently prevent end breakage of the strips as well as the strips "digging in" the guard, strips 10 which may be of any suitable material, preferably of steel are inserted in the guard or abutment member 2 and extend transversely across the ends of the milled surfaces 5 the proper distances inwardly from the ends of the milled surfaces to form a stop or stops for the ends of the strips 7. This gives the ends of the guard a square or a transverse abutment and milling to a depth equal to the thickness of the strip plus suitable tolerance. By this construction pinching of the ends of the strips is entirely eliminated, also by the insertion of the shoulder forming strips 10 it is possible to control exactly the active length of the guard milling which will permit the valve strips 7 to be made of exact sizes in large quantities and will consequently eliminate the fitting by hand of the strips to determine the proper length of the strips, since in approved methods of construction previously in use it was almost impossible to control exactly the length of the guard milling.

It will be understood that the invention is not to be limited to the specific construction or arrangement of parts shown but that this may be modified widely within the invention defined by the claim.

What is claimed is:

The combination with a valve seat having a plurality of ports, a plurality of thin, elastic, valve-forming strips free to permit uniform bending, an abutment block having curved abutment surfaces for said valve strips, said curved abutment surfaces being milled longer than the corresponding valve strips and certain of said curved abutment surfaces and valve-forming strips being longer than others, shoulder-forming strips inserted in said abutment block and extending across the longer of said curved abutment surfaces inwardly of the ends of the curved abutment surfaces, and other shoulder-forming strips inserted in said abutment block and extending across the ends of the shorter curved abutment surfaces, said shoulder-forming strips providing square transverse ends for the active portions of said curved abutment surfaces.

In testimony whereof I affix my signature.

ALEXANDER V. SAHAROFF.